(12) United States Patent
Ulahanan et al.

(10) Patent No.: US 8,980,351 B2
(45) Date of Patent: Mar. 17, 2015

(54) METHOD OF TREATING HOT COOKING OIL

(76) Inventors: Joby Ulahanan, Rochester Hills, MI (US); Kevin Hunter, Ortonville, MI (US)

( * ) Notice: Subject to any disclaimer, the term of this patent is extended or adjusted under 35 U.S.C. 154(b) by 880 days.

(21) Appl. No.: 13/184,871

(22) Filed: Jul. 18, 2011

(65) Prior Publication Data

US 2013/0022722 A1    Jan. 24, 2013

(51) Int. Cl.
    *C11B 3/10*     (2006.01)
    *C11B 3/00*     (2006.01)
    *C11B 13/00*    (2006.01)

(52) U.S. Cl.
    CPC . *C11B 3/008* (2013.01); *C11B 3/10* (2013.01); *C11B 13/00* (2013.01)
    USPC .......................... 426/417; 426/330.6; 426/423

(58) Field of Classification Search
None
See application file for complete search history.

(56) References Cited

U.S. PATENT DOCUMENTS

| | | | | |
|---|---|---|---|---|
| 4,312,845 A | * | 1/1982 | Wason | 423/339 |
| 4,764,384 A | * | 8/1988 | Gyann | 426/417 |
| 5,075,000 A | * | 12/1991 | Bernard et al. | 210/167.28 |
| 5,143,604 A | * | 9/1992 | Bernard et al. | 210/167.28 |
| 5,391,385 A | | 2/1995 | Seybold | |
| 5,597,600 A | † | 1/1997 | Munson | |
| 6,187,355 B1 | | 2/2001 | Akoh et al. | |
| 6,248,911 B1 | * | 6/2001 | Canessa et al. | 554/191 |
| 6,368,648 B1 | | 4/2002 | Bertram et al. | |
| 8,066,889 B2 | * | 11/2011 | Bivens et al. | 210/767 |
| 2008/0102181 A1 | * | 5/2008 | Rao et al. | 426/542 |
| 2009/0071895 A1 | * | 3/2009 | Hua et al. | 210/500.1 |

OTHER PUBLICATIONS

Berg, et al., "Adsorptive Regeneration of Used Cooking Oils". 81st Annual Meeting American Oil Chemists Society, Apr. 22, 1990.†
Britesorb Food & Beverage Absorbents, PQ Corporation, Valley Forge, PA.†
Miller, N. 1990. Adsorptive Regeneration of Used Cooking Oils. Presented at the 81st Annual Meeting AOCS, Baltimore, MD 1990.†

\* cited by examiner
† cited by third party

*Primary Examiner* — Carolyn Paden
(74) *Attorney, Agent, or Firm* — Alexander Rabinovich

(57) ABSTRACT

A method of treating used cooking oil provides for exposing agitated oil for up to five minutes to a mixture of sodium silicate and silica xerogel in powder form, and filtering resulting oil powder mixture to remove the powder. The ratio of sodium silicate to silica xerogel is 30-70% to 70-30%, preferably 50-50%. The sodium silicate comprises 26-28% of $Na_2O$, 53-55% of $SiO_2$, and 15-20% of $H_2O$, with bulk density of about 29-37 $lbs/ft^3$, whereas the silica xerogel comprises: 96-99% of $SiO_2$, and 1-4% of $Na_2SO_4$, with bulk density of about 24-27 $lbs/ft^3$, the particle size being between 35 and 50 microns. Alternative embodiments provide the exposure of the oil first to one component of the mixture and then to another or the exposure to a single treating agent comprising 8-19% of $Na_2O$, 66-83% of $SiO_2$, 8-14% of $H_2O$, and 0.1-2% of $Na_2SO_4$.

7 Claims, 3 Drawing Sheets

METHOD OF TREATING HOT COOKING OIL

BACKGROUND OF THE INVENTION (1) Field of the Invention

The present invention relates to a process for treating used frying oil or fat (further collectively referred to as cooking oil or oil) from frying operations, such as industrial frying operations and restaurants, in order to remove impurities from the cooking oil, restore its odor, color and other characteristics and thus make it possible to reuse the oil extending its service life.

(2) Description of Related Art

There is a large number of restaurants in the United States. These facilities employ large quantities of cooking oil for frying potatoes, sea food, chicken and many other food items for immediate consumption. Another mammoth demander of cooking oil is a food industry where food is prepared, packaged, and shipped in mass quantities for future consumption. Since frying oil decomposes over time and use due to the formation and acquisition of various contaminants during cooking, its continuous use, no matter how economically justified and attractive it may be, is inadmissible without removing those contaminants.

Disclosed in U.S. Pat. No. 5,391,385 of J. Seybold is a process for treating cooking oil containing contaminants comprising the steps of heating the oil to a temperature of 180° F. to 400° F., contacting the oil with a composition consisting of a mixture of 60% to 80% amorphous silica and 20 to 40% alumina for a time sufficient to remove contaminants from the oil; and separating the composition from the oil. The amorphous silica is selected from the group consisting of silica gel, precipitated silica and fumed silica, and the alumina is selected from the group consisting of activated alumina, calcined alumina, hydrated alumina, precipitated alumina, pseudoboehmite, bayerite and gamma alumina. The amorphous silica is preferably a hydrogel, the alumina is preferably a hydrated alumina, and the composition contains 70% of silica hydrogel and 30% of hydrated alumina.

Known from U.S. Pat. No. 6,187,355 of C. Akoh et al. is a method of treatment and recovery of used frying oils that employs combinations of adsorbents and antioxidants such that the recovered frying oil can be reused. Used frying oil is treated with a ternary mixture of adsorbents comprising calcium silicate, magnesium silicate and at least one of a porous rhyolitic material and silicon dioxide in effective amounts to reduce free fatty acids of the treated used frying oil as well as improve total polar component, oil stability and color thereof. Combinations of antioxidants can be included in the treated oil in effective amounts to improve oil stability and service life of the treated used frying oil.

U.S. Pat. No. 6,368,648 of B. Bertram et al. also discloses a method of treating used cooking oil. The process provides for passing the used cooking oil from a used cooking oil source to a holding vessel, and contacting the used cooking oil with a predetermined amount of purifying material (such as amorphous hydrous precipitated synthetic magnesium silicate) upon accumulation of a first predetermined amount of the oil in the holding vessel. The used cooking oil and the purifying material are then passed from the holding vessel to a filter apparatus upon accumulation of a second predetermined amount of the oil in the holding vessel. The second predetermined amount of oil is greater than the first predetermined amount. Upon passing of the used cooking oil and the purifying material from the holding vessel to the filter apparatus, the purifying material becomes entrained in the filter apparatus. The used cooking oil is then passed from the filter apparatus to the source. After the oil is treated, residual oil and the used purifying material may be removed from the filter apparatus by blowing gas through the filter apparatus.

Also known is a method of decolorization, deodorization and deoxidation of cooking oil comprising filling a porous container with a mixture of plant-based granulated activated carbons and a natural antioxidant material, filtering used oil through a filter to remove food particulates and solids, and storing the porous container with the mixture in the oil (U.S. Patent Application Publication 2008/0102181A1 of R. Rao et al.) The plant-based granulated activated carbons comprises nutshell based granulated activated carbons, and the natural antioxidant material comprises lemon peel.

BRIEF SUMMARY OF THE INVENTION

It is an object of the present invention to propose a method of treating used cooking oil that would provide high quality of purification of the oil under various operational conditions.

According to a first embodiment of a method of the present invention, there is provided used cooking oil which is exposed to a powder mixture of sodium silicate and silica xerogel. The ratio of sodium silicate and silica xerogel in the powder is 30-70% of sodium silicate and 70-30% of silica xerogel, and preferably 50-50%. The oil that may have temperature of 225-375° F. is agitated during the exposure, which lasts up to five minutes. Then, the mixture of oil and powder is filtered. The sodium silicate comprises 26-28% of $Na_2O$, 53-55% of $SiO_2$, and 15-20% of $H_2O$, bulk density being of about 29-37 lbs/ft$^3$, whereas the silica xerogel comprises: 96-99% of $SiO_2$, and 1-4% of $Na_2SO_4$, bulk density being of about 24-27 lbs/ft$^3$.

In another embodiment of the present invention, the exposure of the oil takes place at different times: first, the oil contacts to sodium silicate and then to silica xerogel.

BRIEF DESCRIPTION OF THE DRAWINGS

The above objects and advantages of the present invention will become more readily apparent from the following detailed description taken with the following drawings, in which.

DETAILED DESCRIPTION OF THE INVENTION

Figure 1:
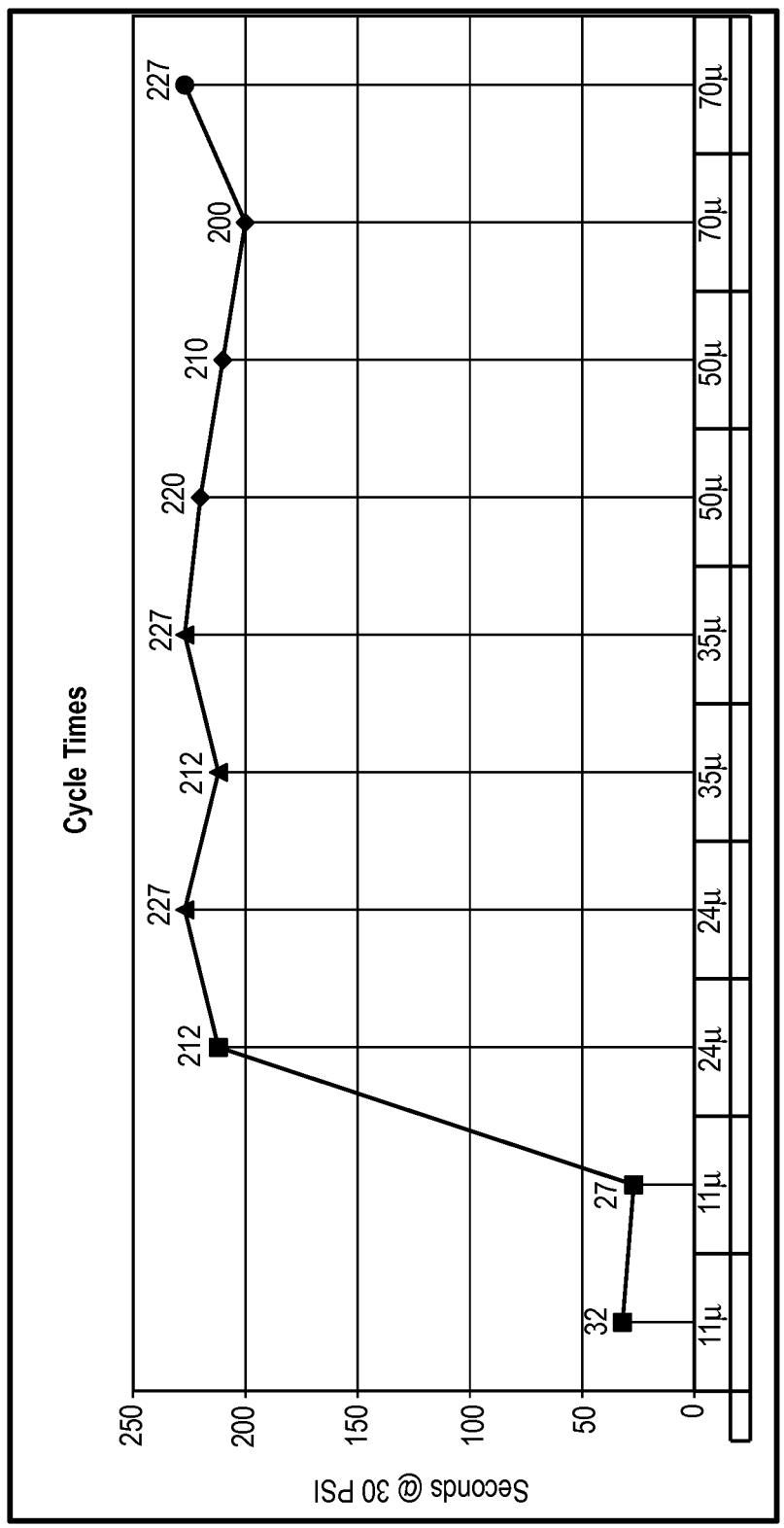
FIG. 1 is a chart illustrating filter life depending on silica xerogel particle size when using the present invention.

The basic process for treating cooking oil using the present invention can be described as follows.

A treating agent is provided for the process according to the method of the invention. The treating agent can be a powder blend of sodium silicate and synthetic amorphous silica xerogel particles. The blend can vary depending on the nature and condition of the oil being treated with the sodium silicate ranging from 30 to 70% of the mixture and with the silica varying from 70 to 30% of the mixture. The sodium silicate of the invention is $SiO_2Na_2O$. Its composition is $Na_2O$—26-28%, $SiO_2$—53-55%, $H_2O$—15-20%, bulk density being 29-37 lbs/ft$^3$. Sodium silicate was tested at varying moisture levels. Dry sodium silicate takes longer to reduce the free fatty acids (FFA) in the system to an optimum level of typically less than 0.2%. Although both dry and moist sodium silicates remove FFA, dwell time for the invention using dry sodium silicate was 10 minutes for optimum reduction of FFA, whereas with the moist sodium silicate the dwell time for optimum FFA reduction is 5 minutes. The preferable sodium silicate moisture level is 15-20%.

Xerogel is a term used for dried out open structures which have passed a gel stage during preparation (e.g. silica gel). Xerogels usually retain high porosity (25%) and large surface area (150-900 $m^2/g$), along with very small pore size (1-10 nm). For the purposes of the present invention, xerogel produced by J.M. Huber Corporation, Locust, N.J., can be used. The silica xerogel of the invention has the following composition: $SiO_2$—96-99%, $Na_2SO_4$—1-4%, bulk density being 24-27 lbs/$ft^3$, moisture of 1-4%. Both Xerogel and Hydro gel were tested. Xerogel is believed to provide better soap removal, does a better job of removing color bodies, and develops a more stable filter cake that provides longer filter life and better flow through the filter. Continuous filtration, unlike the batch one, keeps the FFA under better control and thus less soap is created allowing for longer filter cycles and better performance. Yet, the use of the treatment according to the invention will allow more oil to be filtered before the filter has to be changed. At a flow rate of 1 gallon/sq. ft./min., 1,000 ml of oil may be filtered through 0.049 sq ft of filter area, at a pressure differential of up to 10 psi. When using a Hydro gel, the filter media blinds off at a pressure differential of 30 psi after only filtering 650 ml of the oil.

The method of the invention also admits the presence of other components in the treating agent such as clays, activated carbon, zeolite, etc. Since the xerogel is the most expensive portion of the powder used, those other components can be added to the powder to reduce the amount of xerogel and thus the cost of the process. Clay is a primarily inert filler which has no effect on the process. Activated carbon and zeolite will have some effect on the process. Activated carbon is well known for its ability to remove color bodies, flavors and odors from fluids when used in filtration. Zeolite is a naturally occurring silica. It is cheap and abundant; it will remove some of the soaps and has the added benefit of providing good cake formation and improved filter flow. But zeolite contains trace amounts of naturally occurring metals. The metals may contribute to soap formation. It may thus be beneficial to use zeolite for a restaurant application, but may have a negative impact on performance for industrial applications as the soap formation may be of greater concern.

The preferred composition of the treating agent for the purposes of the present invention can be prepared by mixing (blending) sodium silicate and synthetic amorphous silica xerogel particles in a V blender well known in the art and commonly used in the pharmaceutical, chemical and food industries for mixing powders and granules. An example of such V-blender is shown and described in www.brighthub.com/engineering/mechanical/articles/53250.aspx incorporated herein by reference without limitation. Other types of blenders such as ribbon blenders may be used as well.

The powder is added to cooking oil coming from a cooking process. The preferred percentage is 2% powder by weight, i.e., 98 lbs oil, 2 lbs powder, although this can vary in practice depending on the application. Some plants maintain better control over their process and can use less powder and some application may require more powder. Also, some foods will have a higher impact on the buildup of FFA and soaps. A reasonable range of powder is 1 to 2.5%. The cooking oil comes heated to 225° to 375° F., and the method according to this invention deals with the oil equally well in this whole range.

With regard to cooking oil temperature, it is appreciated that cooking oils vary depending on the source of the oil. The clearest example is animal fat vs. vegetable oil. Animal fat (for example bacon grease) at room temperatures will turn solid. Vegetable oil will remain liquid at room temperature, but, if put into a refrigerator, will become cloudy as some of the oil begins to solidify. This same process occurs to some extent with all oils. The differences are often subtle and not obvious to the naked eye, but can have a significant impact on the treatment of the oil. DALSORB®, the current product of The Dallas Group of America, Inc., used by many of the customers has a recommended range of 225-275° F. When tested at 350° F., the DALSORB® generated more soaps and was more difficult to filter because the soaps blinded the filter faster. The powder used for the present invention, unlike currently used compositions, performs equally well at 225° F. and at 350° F. and thus does not need to be cooled to 225-275° F. to be treated and then heated back, which brings about saving in capital investment, fewer maintenance issues and less time needed to treat the oil. This appears to be significant for several reasons. The fryers are generally operating at temperature of 300° to 350° F. If the oil has to be cooled to be treated, this requires chillers to cool the oil before treating and heaters to reheat the oil after treating, which this increases the capital cost of the equipment and the energy costs, and slows the process requiring longer processing cycles. If the oil can be treated at cooking temperature, it can be processed with virtually no interruption to the frying process. This is particularly useful for restaurant applications where stores often wait until after they are closed before filtering the oil. This is done to prevent the interruption of the frying operation. So oil, which can be treated on the fly, will provide more consistent oil quality, thus better food quality.

Treating oil at ambient temperature is usually not recommended and would probably only work for certain high quality oils. It is believed that at lower temperatures the oil becomes more viscous, tends to coat the powder particles, and does not enter the pores themselves, resulting in higher FFA. Thus, more powder is needed because only the outer surface is being used in the process. DALSORB®, when tested at the lower temperature, also seemed to require more powder to obtain complete treatment. Oil temperature will vary depending on the operation for a variety of reasons. Many industrial operations (snack foods such as chips and nuts) run a continuous process. During the process, a portion of the oil will be withdrawn, chilled to allow treatment, treated, then reheated to the plants operating temperature, and added back to the fryer. This is a constant process where a portion of oil is being constantly filtered. Maintaining temperature, as the present invention allows for, would be a significant advantage to the process. Some industrial applications use batch frying, i.e. kettle chips. The plant will fry a specific amount of chips. After they are finished the fryer is turned off, the oil is chilled, processed, and then added back to the fryer where it has to be reheated before it can fry another batch of potato chips. Again not having to cool and reheat the oil would be a benefit to the operation. Some restaurants will filter the oil at the end of the day, shortly after the fryer has been turned off, the oil being already at an elevated temperature and needing no heating to be processed. Since the oil will not be used again until the next day, the store may have the luxury of allowing the oil to cool on its own. Other stores hire a cleaning service to maintain their oil. In these stores, the employees may not do anything to the oil, but turn off the fryer at the end of the day. The cleaning service will come into the store at, for example, 3 a.m., treat the oil, clean the fryer, dispose of bad oil if needed, and recharge the fryer with fresh oil. But before the service can do any of this, they have to reheat the oil from the now room temperature to 225°-275° F. for treatment.

Though each type of oil is different and, thus, every process is unique to some extent, the basic reaction according to the present method proceeds as follows. The oil is agitated such that all the oil is exposed to the powder over a period of up to 5 minutes. The agitation can be performed in various ways; most common for a restaurant is recirculation of oil using a pump. In industrial applications, the oil would be preferably added to a tank (not shown), then a measured amount of powder is added to the same tank. A mixer (not shown) is turned on and the oil/powder combination is mixed for about 5 minutes. The goal is to have all the oil contact the powder to optimize the reaction. The sodium silicate removes FFA created by the cooking process, but this reaction gives rise to soaps. The silica xerogel removes the soaps. Some foods and oils create more FFA and may need a higher concentration of sodium silicate. Some applications may have a bigger soap yield and, therefore, need a higher percentage of silica xerogel. Specifically, systems with continuous treatment will keep the FFA content under better control and less soap is created, thus requiring less silica xerogel, which is a more expensive part of the composition.

The oil powder mixture is then filtered to remove the powder, which completes the process. For filtration, such filters as, for example, pressure filters made by Sparkler Filters, Conroe, Tex.; Star Filters Div. of Hilliard Corp., Elmira, N.Y.; or Oberlin Filter Company, Waukesha, Wis., can be used (not shown). Other filters could also work, and, for example, plate and frame filters can be used for batch applications. Automatic indexing filters like the Oberlin filter are preferred for continuous application, and they appear to be much less time consuming. Vacuum filters (not shown) made, for example, by Prince Castle, Carol Stream, Ill., or Manitowoc Foodservice, New Port Richey, Fla., can be used as well. The filter is located next to the tank and the mixture is pumped through the filter. The powder and contaminants are removed by the filter paper in the filter and the oil is returned to the fryer or other cooking units.

Shown in FIG. 1 are the results of testing in a chart form of the above-described powder used to implement the present invention that illustrate and compare filter life with different particle sizes of the silica xerogel. It is to be understood that, when the particles of the powder have a mean size of 11 microns, the mixture blinds the filter media almost immediately.

Figure 2:
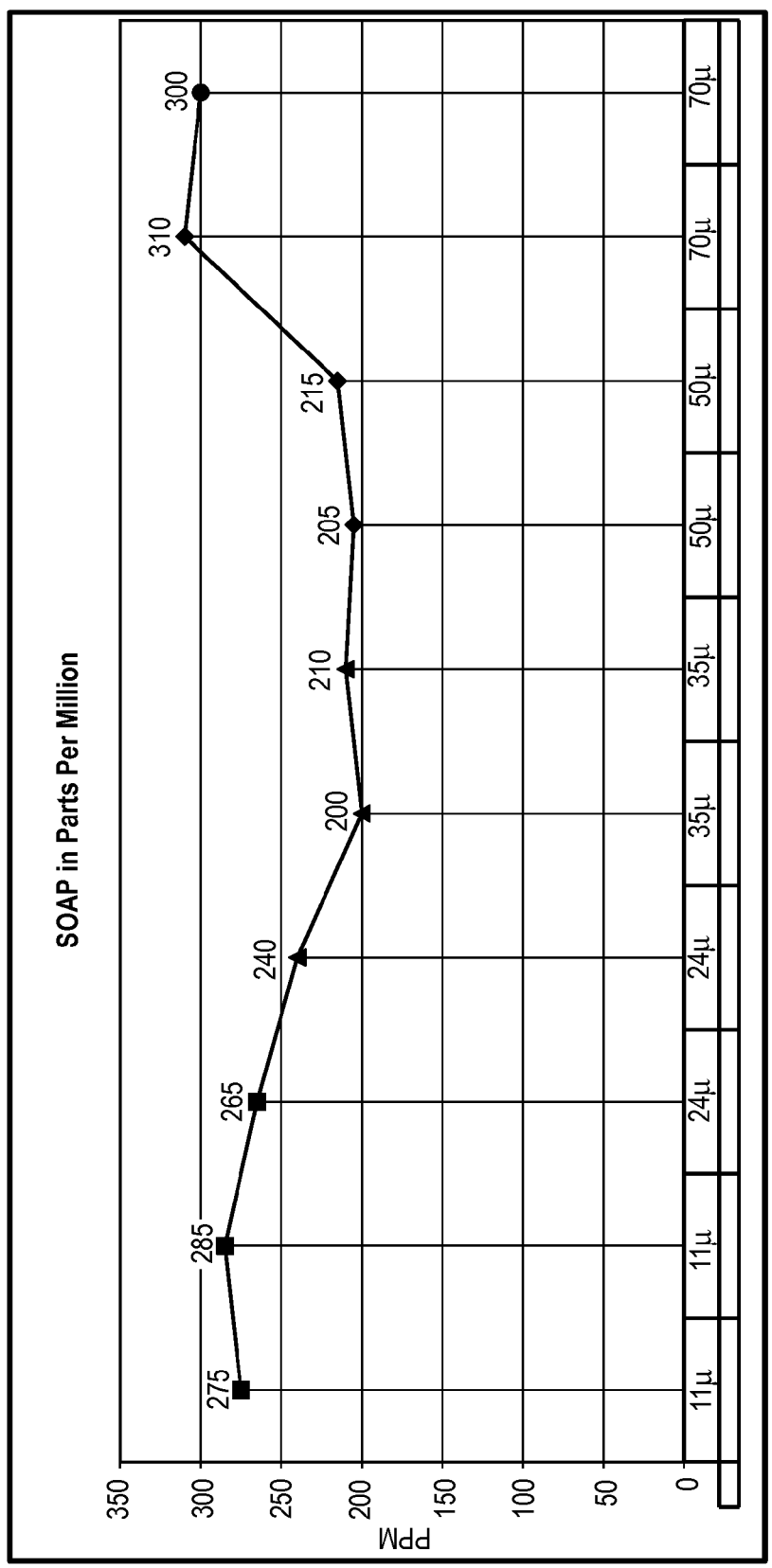
FIG. 2 is a chart illustrating the effect the silica xerogel particle size produce on removing soaps from the oil.

The chart depicted in FIG. 2 shows the effect particle size has on soap removal. When the Silica xerogel has a mean particle size between 35 microns and 50 microns the powder is most effective at removing soaps from the oil. Smaller particle sizes and larger particle sizes are less effective.

Figure 3:
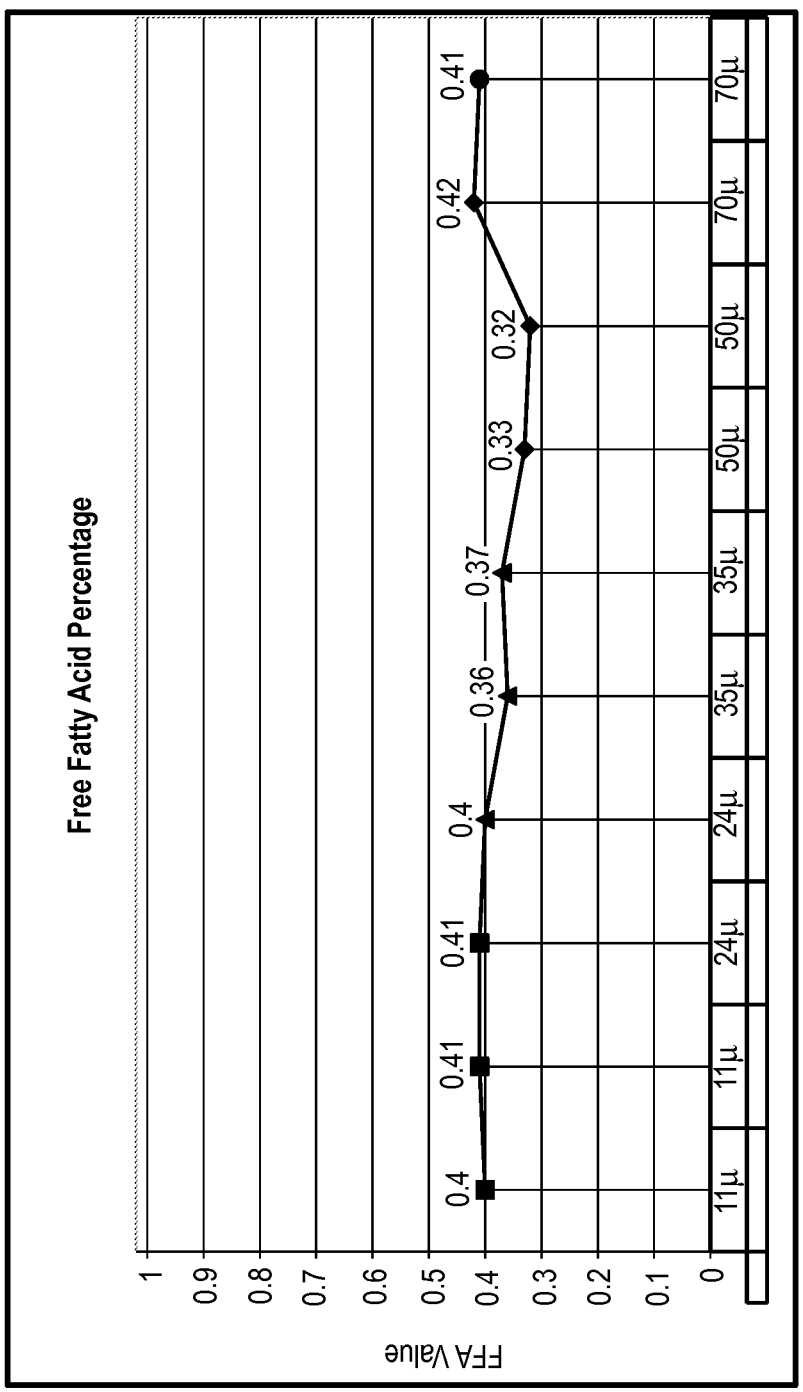
FIG. 3 is a chart demonstrating the effect the particle size of the silica xerogel has on the reduction of free fatty acids.

The chart in FIG. 3 demonstrates the effect of the particle size of the silica xerogel on the reduction of free fatty acids. Again, a particle size between 35 microns and 50 microns is believed to have the most positive effect.

As a whole, the tests demonstrated that when treated with 11 micron particles the oil has FFA 10-15% higher than when treated with 35-50 micron particles. The soaps in the oil, when treated with 11 micron particles, are 20% higher than when treated with 35-50 micron particles. Again, when treated with 11 micron particles the filter media blinds almost immediately providing only 10% of the filtration capacity in comparison with larger particles. On the other hand, treated with 70 micron and larger particles the oil has FFA 10-15% higher than when treated with 35-50 micron particles. When it is treated with 70 micron and larger particles, the soaps in the oil are 30% higher than when it is treated with 35-50 micron particles. With regard to filter life, treating oil with 70 mirror particles is about the same as with 35-50 micron particles. Thus both the small particles and the large particles are less effective at treating the oils than the middle sized particles, and this seems to be true for both phases of the treatment, i.e., removal of FFA and removal of soaps. But only the small particles have a significant effect on the filter's ability to remove the filter aid from the oil.

In another embodiment of this invention, the sodium silicate and the silica xerogel can be added separately with the same performance (in the same tank or separate ones—not shown). Adding the ingredients separately provides the operator with the opportunity to customize the treatment for specific requirements, but introduces a greater potential for error by not adding the correct amount of each powder. Separate addition also increases the potential for airborne dust particles to collect on the equipment and the floor. The mixture is then filtered to remove the powder and the oil is returned to the cooking application. For example, the silica xerogel may be added to a first tank and agitated, then the mixture may be pumped to a second tank where the sodium silicate is added and agitated. The mixture is then filtered to remove the powder and the oil is returned to the cooking application. By experience, premixing the powder offers the ease of use to the customer, provides better control of ingredients, reduces the number of items in inventory and provides consistent performance, although, as noted above, premixing the ingredients is not required for the powders to work. It is necessary that both ingredients are present in the oil at the same time during the treatment process. The powder used in the process according to the invention is suitable for either batch treatment or continuous treatment at a wide temperature range. This allows the plant to treat the cooking oil at full temperature without interrupting the cooking process.

Yet another embodiment of the present invention provides a single treating agent comprising 8-19% $Na_2O$, 66-83% $SiO_2$, 8-14% $H_2O$, and 0.1-2% $Na_2SO_4$ in a powder form, agitating used cooking oil when exposed to this treating agent, the duration of the exposure being up to five minutes, and subsequent filtering the resulting oil-treating agent powder mixture to remove the treating agent powder, to thereby obtain cooking oil that is substantially free from free fatty acids, soaps and particulate, and thus can be reused.

Benefits of the cooking oil treatment in accordance with the present invention are believed to be the following: it reduces FFA, reduces or eliminates soaps and foaming, removes color bodies from the oil, reduce polar compounds. The treatment removes the various contaminants either by adsorption or reaction on the active sites. This is done without creating soaps or adding trace metals to the oil. To be correct, soaps are first created and then removed. Soaps cause two primary problems: they cause more oil to stick to a food product, making it less healthy and affecting the taste of the product; and the soaps and oils on the product shorten the shelf life of the product. Product life is a bigger issue for industrial applications, than for restaurants as snack foods such as potato chips may be stored for months at a time, but restaurant food is cooked for immediate consumption. As to the trace metals, they come from the food being cooked and the utensils and materials the food comes in contact with. Sometimes trace metals can also be added by the powders added to treat the oil.

Among other benefits: the treatment according to the present invention can be performed in continuous operation, it can be performed at full operating temperature, it provides improved oil stability, extends oil life, and requires less resonance time than known compositions. Understood here by resonance time is the length of time needed for the oil to be in contact with the powder for the powder to optimize its performance. The less resonance time is due to the sodium silicate used in the process according to the invention having moisture not exceeding 15-20%, which makes the whole composition more reactive than such known compositions currently used on the market as DALSORB®. The composition used for the present invention makes it possible to obtain maximum reduction of FFA within about five minutes. Also, the treatment in the accordance to the present invention provides higher filtration rate. This is because xerogel used in the process has more pores, less moisture, and a controlled particle size in comparison with hydro gel. The greater number of smaller pores allows better flow rates while removing smaller particles. Less moisture allows the xerogel to remove a greater percentage of the soaps without forming as much gelatinous material. Gelatinous material blind filter paper very quickly and is not conducive to cake formation. Controlling the particle size of the silica xerogel is important to filtration performance. As noted earlier, particles of 5-20 microns remove the soaps but cause the filter to blind quickly. Particles larger than 80 microns make an excellent filter cake but are not as good at removing the soaps. The combination sodium silicate and silica xerogel used in the invention allows better flow through the filter and builds a dryer cake less prone to blinding. The treatment provides better cake formation in filter, and better cake means faster filtration, less paper consumption, better filtrate quality. It lengthens filtration cycle reducing consumption of filter media and also provides cost savings by extending life of oil, reducing treatment time, eliminating need for down time during treatment process, reducing consumption of filter media, and reducing the amount of cooking oil that must be disposed of. The oil treated in accordance with the present invention leaves fewer residues on food, increasing quality and extending the shelf life of the food. Treated oil provides food with consistent appearance and taste.

While the present invention has been described in connection with a number of exemplary embodiments, and implementations, the present inventions are not so limited, but rather cover various modifications, and equivalent arrangements, which fall within the purview of prospective claims.

The invention claimed is:

1. A method of treating used cooking oil, said method comprising:
   providing said used cooking oil;
   exposing said used cooking oil to a treating agent comprising powder of sodium silicate and silica xerogel, said sodium silicate comprising 26-28% of $Na_2O$, 53-55% of $SiO_2$, and 15-20% of $H_2O$, bulk density being of about 29-37 lbs./ft$^3$, and
   filtering resulting oil powder mixture to remove the powder,
to thereby obtain cooking oil that is substantially free from free fatty acids, soaps and particulate, and thus can be reused.

2. A method of treating used cooking oil, said method comprising:
   providing said used cooking oil;
   exposing said used cooking oil to a treating agent comprising powder of sodium silicate and silica xerogel, said silica xerogel comprising 96-99% of $SiO_2$, and 1-4% of $Na_2SO_4$, bulk density being of about 24-27 lbs./ft3, the particle size being between 35 and 50 microns, and
   filtering resulting oil powder mixture to remove the powder,
to thereby obtain cooking oil that is substantially free from free fatty acids, soaps and particulate, and thus can be reused.

3. A method of treating used cooking oil, said method comprising:
   providing said used cooking oil;
   providing powdered treating ingredients comprising sodium silicate and silica xerogel, said sodium silicate comprising 26-28% of $Na_2O$, 53-55% of $SiO_2$, and 15-20% of $H_2O$, bulk density being of about 29-37 lbs/ft$^3$,
   exposing said used cooking oil to one of said ingredients,
   subsequently exposing said mixture of said used cooking oil and said one of said ingredients to another of said ingredients, and
   filtering resulting oil powder mixture to remove the powder,
to thereby obtain cooking oil that is substantially free from free fatty acids, soaps and particulate, and thus can be reused.

4. A method of treating used cooking oil, said method comprising:
   providing said used cooking oil;
   providing powdered treating ingredients comprising sodium silicate and silica xerogel, said silica xerogel comprising 96-99% of $SiO_2$, and 1-4% of $Na_2SO_4$, bulk density being of about 24-27 lbs./ft3, the particle size being between 35 and 50 microns,
   exposing said used cooking oil to one of said ingredients,
   subsequently exposing said mixture of said used cooking oil and said one of said ingredients to another of said ingredients, and
   filtering resulting oil powder mixture to remove the powder,
to thereby obtain cooking oil that is substantially free from free fatty acids, soaps and particulate, and thus can be reused.

5. A method of treating used cooking oil, said method comprising:
   providing said used cooking oil;
   exposing said used cooking oil to a treating agent comprising powder of sodium silicate and silica xerogel, said sodium silicate comprising 26-28% of $Na_2O$, 53-55% of $SiO_2$, and 15-20% of $H_2O$, bulk density being of about 29-37 lbs./ft$^3$, said used cooking oil being agitated when being exposed to said powder, a ratio of sodium silicate and silica xerogel in said powder being 30-70% of sodium silicate and 70-30% of silica xerogel, the duration of said exposure of said used cooking oil to said powder being up to five minutes,
   filtering resulting oil powder mixture to remove the powder,
to thereby obtain cooking oil that is substantially free from free fatty acids, soaps and particulate, and thus can be reused.

6. A method of treating used cooking oil, said method comprising:
   providing said used cooking oil;
   exposing said used cooking oil to a treating agent comprising powder of sodium silicate and silica xerogel, said silica xerogel comprising 96-99% of $SiO_2$, and 1-4% of $Na_2SO_4$, bulk density being of about 24-27 lbs./f$^3$, the particle size being between 35 and 50 microns, said used cooking oil being agitated when being exposed to said powder, a ratio of sodium silicate and silica xerogel in said powder being 30-70% of sodium silicate and 70-30% of silica xerogel, the duration of said exposure of said used cooking oil to said powder being up to five minutes,
   filtering resulting oil powder mixture to remove the powder,
to thereby obtain cooking oil that is substantially free from free fatty acids, soaps and particulate, and thus can be reused.

7. A method of treating used cooking oil, said method comprising:
- providing said used cooking oil;
- providing a treating agent comprising 8-19% $Na_2O$, 66-83% $SiO_2$, 8-14% $H_2O$, and 0.1-2% $Na_2SO_4$,
- exposing said used cooking oil to said treating agent, said used cooking oil being agitated when being exposed to said treating agent, the duration of said exposure of said used cooking oil to said treating agent being up to five minutes, and
- filtering resulting oil-treating agent mixture, whereby cooking oil that is substantially free from free fatty acids, soaps and particulate, and thus can be reused, is obtained.

\* \* \* \* \*